(12) United States Patent
Firkan

(10) Patent No.: US 9,193,423 B2
(45) Date of Patent: Nov. 24, 2015

(54) HULL CONFIGURATION FOR SUBMARINES AND VESSEL OF THE DISPLACEMENT TYPE WITH MULTIHULL STRUCTURE

(71) Applicant: Serdar Firkan, Indianapolis, IN (US)

(72) Inventor: Serdar Firkan, Indianapolis, IN (US)

( * ) Notice: Subject to any disclaimer, the term of this patent is extended or adjusted under 35 U.S.C. 154(b) by 43 days.

(21) Appl. No.: 14/169,159

(22) Filed: Jan. 31, 2014

(65) Prior Publication Data
US 2015/0217844 A1 Aug. 6, 2015

(51) Int. Cl.
| | | |
|---|---|---|
| *B63B 1/00* | (2006.01) | |
| *B63G 8/00* | (2006.01) | |
| *B60F 3/00* | (2006.01) | |
| *B63H 11/00* | (2006.01) | |
| *B63B 1/04* | (2006.01) | |
| *B63G 8/08* | (2006.01) | |

(52) U.S. Cl.
CPC ............... *B63G 8/00* (2013.01); *B60F 3/0007* (2013.01); *B63B 1/042* (2013.01); *B63G 8/001* (2013.01); *B63G 8/08* (2013.01); *B63H 11/00* (2013.01)

(58) Field of Classification Search
CPC ............ B63G 8/00; B63G 8/08; B63G 8/001; B63H 11/00; B63B 1/042; B60F 3/0007
USPC ........ 114/312, 56.1, 61.1, 61.12, 61.2, 61.27, 114/61.29, 61.3, 61.31, 61.32
See application file for complete search history.

(56) References Cited

U.S. PATENT DOCUMENTS

| | | | | |
|---|---|---|---|---|
| 3,773,006 A | * | 11/1973 | Black | 114/289 |
| 3,949,694 A | * | 4/1976 | Bastide | B63C 11/42 114/313 |
| 4,429,652 A | * | 2/1984 | Stol | 114/20.1 |
| 5,503,100 A | * | 4/1996 | Shaw | 114/274 |
| 6,131,529 A | * | 10/2000 | Smith | 114/271 |
| 7,267,072 B2 | * | 9/2007 | Zhang | 114/312 |
| 2002/0152947 A1 | * | 10/2002 | Hilleman | 114/338 |

* cited by examiner

*Primary Examiner* — Anthony Wiest

(57) ABSTRACT

This invention relates to a design of a ship hull, and more particularly, to cargo ship or submarine configurations featuring flow channels on the hull surfaces, and multihull structure, and improved diving and surfacing properties, and reduced hydrodynamic resistance, and improved hull damage resistance, and further comprising underwater hub cargo loading and unloading, and relates to manned or unmanned or semi-autonomous sea vessels. A hull design consists of a curvative hull form transversally and symmetrical about its center line CL and design water line, and consists of ballast and storage tanks and cargo compartment within the hull portions and operable to adjust the draft and the depth of the vessel according to the loaded weight, and provides detachable installation options. The invention relates to a ship hull design with reduced block coefficient (Cb) values.

2 Claims, 15 Drawing Sheets

HULL CONFIGURATION FOR SUBMARINES AND VESSEL OF THE DISPLACEMENT TYPE WITH MULTIHULL STRUCTURE

FIELD OF THE INVENTION

This invention relates to a design of a ship hull, and more particularly, to cargo ship or submarine configurations featuring flow channels on the hull surfaces, and multihull structure, and improved diving and surfacing properties, and reduced hydrodynamic resistance, and improved hull damage resistance, and further comprising underwater hub cargo loading and unloading, and relates to manned or unmanned or semi-autonomous sea vessels.

BACKGROUND OF THE INVENTION

The object of this invention is to provide high speed, long range cargo ship or cargo submarine featuring a multihull and reduced hydrodynamic resistance used for any cargo (including sensitive cargos like live stocks, food, flammable chemicals etc.), passenger, vehicle, military transport and for evacuation rescue purposes under extreme weather and sea conditions both at sea, rivers, shallow waters, trans-oceanic routes, arctic ice conditions as manned or unmanned (known as USV/AUV) or semi-autonomous. More specifically, the invention relates to an arrangement as disclosed in the preamble of independent claim 1.

As the global trade increases, the number of containers is increasing to higher levels which addresses to bigger port capacities, higher infrastructure investments and increasing need for ultra large cargo ships in order to achieve lower transport costs per unit cargo volume.

Larger container ships under strict environmental emission standards mean lower speeds and longer transport periods.

In case of lack of number of container per vessel; results higher unit transport cost per container (division of total ship operating costs to container number transported per shipment). There is always a risk for lack of cargo from a port within the fluctuation of economic and trade from that port or country to another. Not all the containers from one port to final destination are allocated at all times, the container ships have to call at various ports on the route for unloading and loading to final destination point; this is the need to use the full capacity of the ship at high efficiency.

Multi-stop routes create delays and generally extends transport times due to unexpected waiting especially when the arrival port is too busy and/or due to bad weather conditions. These delays create extra costs to ship operators. Longer transport times mean slower trade and delayed cash flow between traders and economies.

For the transport of food and medical and pharmaceutical goods, longer transport times have a negative effect on freshness and shelf life. In today's global supply regime, faster transport periods are needed between supply sources and their consumption locations. Air transport is an alternate for faster and safer transport but it is too expensive, and have weight limitations, and have cargo type restrictions (for example cannot carry bulk size of live stocks or flammable products) and effected from weather conditions and needs qualified personnel for aircraft operation and have higher investment return rates.

Urban transport volume is increasing especially for cross continents travel and yields to bigger aircraft and higher aircraft numbers to be given into service. This means higher emissions due to travel number and higher fuel costs due to increasing demands despite the efforts for reducing the unit carbon emission values per passenger per flight miles. Many successful inventions and modifications have been done in aircraft industry in order to reduce emissions and fuel costs and as well as unit passenger travel costs. On the other hand mid-range sea transport seems more essential between continents where aircraft operation costs are higher. The invention offers high speed sub-sea passenger transport between continents faster than conventional ships even under extreme sea and weather conditions. The invention also offers touristic potential to economies which it can travel people to adventurous places with a different ways of transport.

On the other hand, despite the early prior arts of submarines, long range high payload submarines are only available for military purposes around the World. Besides there have been several attempts for high speed ekranoplanes and sea planes which were limited to high operational costs and high design complexity. Other attempts were the nuclear powered cargo ships to be sailed via arctic routes in order to reduce the transport times.

Heavy weather and sea conditions are also a great barrier in front of the shipping. Current world trade is now asking and being more demanding for uninterrupted service levels. The only and the best way to ensure this, is to cruise underwater and even keeping the loading and unloading underwater.

The invention provides unmanned cruise option that yields lower transport costs, longer underwater ranges even under arctic and extreme weather conditions without any service interruption and lack of efficiency.

Sea route safety is one of the major concerns that limit to open new sea routes due to piracy attacks and kidnapping especially around Africa, India and Persian Gulf and nearby countries which are politically instable or have lack of central authority. The combination of sub-sea cruise at high speed enables safer cruise and evasive maneuverability against attacks.

New mineral and fuel resources and their routes, for example Greenland region, and North Sea, requires new sea routes and safer supply and maintenance vessels due the extreme environment operating conditions. Current sea vessels, prior arts have limited operations or service options under these circumstances. Prior arts offer less stability and sea keeping capability under extreme environments such as windstorms, hurricanes, arctic winter conditions etc.

The possibility of sea accidents, injuries are so likely under conditions above mentioned. The rescue vessels with prior arts together with aircrafts and helicopters offer limited options and sometimes impossible to reach to the wreckage area in order to rescue the survivors. The invention offers high stability and much reliable operation options.

Hull damage is a major concern especially in high traffic sea zones when collusion conflict probabilities are with significant numbers. The double hull, and multihull solutions are still underway in research and development in marine industry.

The oil and chemical spills is one of the major risks for environment. These incidents generally occur under bad weather or low visibility conditions due to collusion with another vessel or object. Immediate arrival to the incident area is always important and prior arts are offering very slow rate of reaction. An effective collection and the cleaning of the spilled material is a major issue and current systems only offers a surrounding sponge or similar systems in order to limit the spillage are. The invention provides a faster arrival option to the incident area and further comprising an oil spill arrangement that enables suction from the bottom and leads to increase the efficiency of the spill elimination process throughout the surface.

On the other hand, the super sea structures are on the way for building new living areas on or below the sea level. These structures will need consistent way of logistics. The invention provides necessary reliable way of transport from or to those structures mostly independent or less effected from weather and sea conditions in order to provide consistent supply and logistics. This option enables marine and military transport to strategic sub-sea bases and oceanic research facilities.

Most of the submarine designs have higher draught levels above 10 meters which are limiting cruising at shallow water bodies, leads high sonar signature from fore and side reflections.

SUMMARY OF THE INVENTION

The design of the ship hull is intended for high speed cruise under any type of sea and weather condition with reduced hydrodynamic resistance at elevated speeds and increased sea keeping and stability. The main advantage is lower design water line levels (TdWL) when compared to larger hull breadths (Bwl) with lower block coefficients (Cb) resulting with reduced hydrodynamic resistance.

The invention has a curvative hull form about its center line (CL) and design water lines and distinctive curvative sections along the center line (CL) from aft to fore including aft perpendicular AP and fore perpendicular FP. The design has a sharp arrow style bow at the fore end with a vertical flat aft shape ending facing to backwards with 90 degrees but not limited to. The advantage of the bow style is to increase the penetration to the fluid wall during at high velocities and it is believed that a bulb effect may occur beyond of the fore end due to the form of the water lines.

The invention has an increasing height from fore to aft combine with a narrowing and enlarging curvative form by its breadth that creates a semi-open nozzle form which enables the easy transfer of the fluid to the aft end of the hull by artificially increasing the relative velocity of the fluid flow.

The invention's hull beam is increasing from fore to aft and narrows around its midships 1 for a certain portion of its length Lwl and then is continuing to increase to the aft as described more in detail in claims section.

The flat aft end (transom) form offers efficient sizing of cargo doors 2 and easy installation of different types of thrusters without needing any significant modification of the hull construction. The flat aft ending or flat transom is a general concept in most of the modern ship designs.

The invention has a multi-hull form with two symmetrical bottom and top port and starboard keels and one center keel from fore to aft. The object of this solution is to increase stability by keeping the hydrodynamic resistance as low as possible during cruise by splitting the floating volume on the hull.

The breadth (Bwl) value is increased and decreased relatively to center line (CL) more particularly at design water line (TdWL) at described locations in claims and hull height (Hdwl) elevates vertically to design water line (TdWL) vertically both at upwards and downwards directions. This ensures longitudinal stability with less trim values and angles, less pitch, sway, roll, heave, surge, and yaw movement characteristics with its smooth water immersion at surface cruise, anchor or mooring modes. The varied height of the hull form enables different payload values with less trim, roll and pitch values when compared with traditional spherical submarine hull forms.

The invention has a wide breadth (Bwl) relative to general cargo ships, submarines, oil tankers passenger liners, container ships featuring high stability, and see keeping properties, and less possibility of capsize under high height wave conditions. The invention has rounded edges on its beam endings at design water line level both at port and starboard sides of the hull. This solution offers a stable motion control especially during rescue operations, and unloading the payload at surface mooring.

The invention provides lower block coefficient (Cb) values at 0.35 or less depending on the scaling of the invention when compared with container ships (i.e. average of 0.575), general cargo ships (i.e. average of 0.70), submarines (i.e. average of 0.62), passenger ships (i.e. average of 0.625), oil tankers (i.e. average of 0.80) and VLCCs (i.e. average of 0.825) which have typically fully loaded Cb value range from 0.575 to 0.825. The lower block coefficient (Cb) values of the invention provide lower hydrodynamic friction and lower fuel consumption and high cruise speeds.

Another advantage of the ship hull is providing multihull design which has hull portions can be converted to detachable external tank systems as well as internal tanks.

The other advantage of the hull design is to provide the options for arrangement of all known thruster and power generation systems and engine types on the same hull. The said thruster systems can be listed as propellers, pump jets, and MHD thrusters but not limited to.

The invention has a ballasting system together with the tanks for fuel, fuel-discharge, air, oxygen, plasma fuels and convertible cargo bays within the hull portions and operable to adjust the draft and the depth of the vessel which can be installed as detachable units.

The tanks of the invention are located around the vessel, and they are consisting of divisional layout above, below, port side, and starboard sides of the hull. The tanks of the invention are designed to be arranged independently from each other. The invention offers improved hull consistency, and improved floating ability by offering detaching option of the tanks with further comprising ejection systems in case of collusion, and/or grounding.

The invention has moveable rudders on its surface for steering, braking and depth controlling during cruise which are driven by either electric, hydraulic, steam, gas or other means of combined motion systems together with programmable and computerized systems. The said rudders are rotating around y-axis either clockwise or counter clockwise and are sliding either inwards or outwards of the hull parallel to y-axis. The port and starboard rudders have a shark-fin type form and profile and have a concave form from fore to aft direction that enables a lifting effect when cruising forward. These foils are designed to work similar to aircraft flaps. These foils can either be used as an emergency brake system when applied a full angle of attack by benefiting the hydrodynamic resistance fore occurring on the surface area.

The inventor has discovered that a suction unit may be mounted to the hull even without making significant modifications on the main hull design. With this unit, the invention can be used as an oil or chemical spill cleaner from the surface by approaching to the spill under water level. This enables the cleaning even under extreme sea and weather conditions when conventional spill cleaning ships are unable to approach to the spill due to high wave lengths. The spill cleaning version of the invention can be used as unmanned for personnel safety. This invention can be coupled to every oil platform as a standard unit.

The design of the invention enables new design options of the yachts, sails and power boats by benefiting whole or part of the hull form for reducing fuel consumptions, decreasing sail areas, installation of larger solar panels or increased number of solar panels.

The invention is making possible of loading or unloading at underwater hub ports.

The invention is offering highest safety by self-getting to surfaced mode from submersed mode in case of emergency by releasing the cargo from the aft end doors and balancing Archimedes floating principle towards floating condition from submersing condition.

The invention is used both surface and underwater operations particularly submersed and surfaced with rudders 9 located on the surfaces.

The invention is providing transporting several numbers of 10 feet, 20 feet, 40 feet commonly known sea container types and their varied models as well as bulk cargo with adjusted and extended dimension version with a speed of above 60 knots at sub-sea cruise mode.

Another object of the invention is to enable easy and faster cargo loading and unloading within less than one hour as an average.

The hydrodynamic resistance calculations has been carried out and simulated with a CFD program on a CAD software principally based on the resistance force formula $RF=\frac{1}{2} \times \rho \times V_s^2 \times s$ (RF: Resistance Force, p (fluid density), Vs (ship's relative velocity to the fluid), s (wetted area)) originated from the Bernoulli's Law (hydrodynamic pressure formula).

The invention will result in the following positive effects:

The invention offers cargo transport at very high speeds over 60 knots which is more than 3 times faster than conventional cargo ships which have an average cruise speed of 17 knots.

The invention offers much faster transport times and continuous uninterrupted operation for 24 hours during 365 days. If the route is designed in mid-range distances like 1000-1500 nautical miles, this gives a higher container transport numbers even from a Triple EEE class container ships newly built with equal or above 18000TEU capacity.

The invention does not need modern port facilities like big cranes for unloading or loading, only a small ramp and a mobile crane or a container holding truck may be enough for operations due to its aft loading door design option.

The invention is able to cruise at medium depths which gives opportunity to travel without effected from even extremely heavy sea and weather conditions and high waves.

The lower draught profile of the invention provides cruising option at shallow waters.

The lower draught profile of the invention provides lower sonar reflections and signatures on the fore and side profiles when heading to a target.

The invention has an ability to moor or to dock even at shallow waters due to its very low draught (TdWL) profile. The invention gives an opportunity to moor or to dock like amphibious military vessels to any shore location desired to unload or load. With this advantage the invention gives opportunity to create flexible routes depending on the trade volumes. For example new faster routes can be established thru Ontario Lake to North Atlantic or thru Danube or Rheine rivers to Black Sea or North Sea without switching the vessels. Current river cargo vessels are generally not certified to sail at open sea after river transport, they need to transfer their cargo to coasters or container ships at the river exits to open sea.

Most of the damaging sea incidents happen under extreme weather and sea conditions and generally far from rescue helicopter ranges. The invention can easily be converted to a coast guard or rescue boat arrangement even without changing the hull design, and can reach to any incident location faster than all known rescue ships and boats under extreme sea and weather conditions.

The design of the invention is offering a very high stability when surfaced due to particular large breadth when compare with other conventional vessels.

The invention offers multiple duty arrangements according to the operational need without making significant changes on the hull form and saving time and money.

The invention offers less dependency on different types of boats and ships in a fleet by forming multipurpose fleet on a single hull form platform including submarines.

The invention offers operations with less number of crew or no crew on board which helps to reduce the costs, which the crew living areas may be converted to useful areas such a cargo bay.

BRIEF DESCRIPTION OF DRAWINGS

In the following, a non-limiting embodiment of the arrangement according to the invention is described in more detail with the reference to the accompanying drawings wherein.

DETAILED DESCRIPTION OF THE INVENTION

Figure 1:
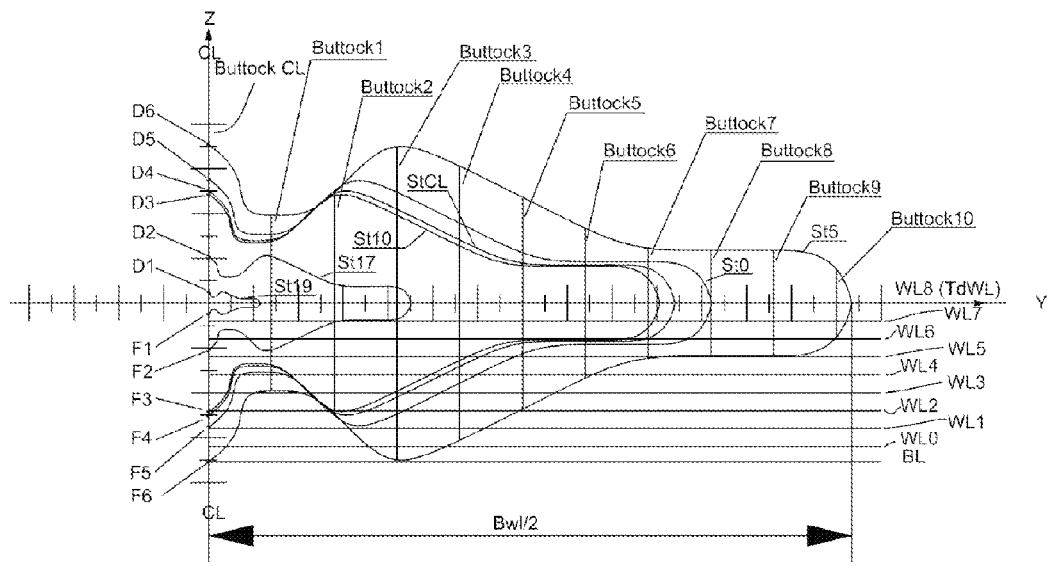
FIG. 1 is a front view of an extract of section frame lines of the ship's hull preferably showing the section frame lines St5, St0, StCL, St10, St17, and St19.

In the following description and in the claims, unless otherwise specified, all disclosures of direction are explained on the basis that the vessel is in a three-dimensional coordinate system where the vessel's length direction, breadth direction and height direction correspond respectively to the x-axis, y-axis and z-axis of the coordinate system, wherein the x-axis and the y-axis are oriented in the horizontal plane whilst the z-axis is oriented in the vertical plane. Furthermore, the forward direction of the ship corresponds to the positive x-direction. The origin of coordinates lies at the intersection of the centerline plane with the transversal plane that contains the aft perpendicular AP.

The abbreviations which are used in this application have the following definitions:

TdWL: Draught (at the design water line)
Bwl: Breadth measured at a given draught TdWL from base line BL to TdWL.
Lwl: Water line length measure at a given draught TdWL; in order words total length of the submerged volume.
Hdwl: Hull height measured from BL up to the top of the hull at full submerged condition.
BL: Baseline of the ship's hull is parallel to the center line CL at the bottom and symmetrical to the z-axis and center line CL and design water line TdWL, which is intercepting the vessel hull at the bottom end of the middle hull portion at section frame line St5.
CL: The horizontal line from aft perpendicular AP to fore perpendicular FP along and parallel with x-axis and Tdwl, intercepts z-axis and y-axis at origin with 90 degrees of angle.
Midships 1: The vertical line intercepts the center line CL at design water line TdWL level with 90 degrees and located at the midpoint of Lwl, which is marked as 1 and is shown with a standard sign according to English literature.
AP: Aft Perpendicular
FP: Fore Perpendicular In the embodiment of figures, the hull designed is described in detail with water lines on x-y cutting planes, section frame lines on z-y cutting planes and buttock lines on z-x cutting planes. The section frame lines are the extracted profile lines from aft to fore which are numbered starting with St label identification from St0 (far aft end, at aft perpendicular AP) to St19 (far end before fore perpendicular FP towards aft direction). Section frame line StCL is the section frame line which is extracted at the midships 1 of the hull. The water lines are located as the horizontal profile lines which are numbered starting with WL sign from WL0 (right above the base line BL) to designed water line WL8(TdWL). The water lines are extracted from the submerged hull form and are transversally symmetrical to the center line CL and symmetrical to the positive z-axis direction above designed water line WL8(TdWL). The buttock lines are the vertical profile lines perpendicular to the x-y plane of the ship CL to either beam directions (positive and negative y-axis direction). The buttock lines are numbered starting with Buttock label identification from Buttock CL (profile at center line CL) to Buttock10 (far port side close to end of the half breadth Bwl/2 of the vessel). Buttock lines are transversally symmetrical to the vessel's center line CL. All section frame lines, water lines, buttock lines, flow channels in claims for description reference of the invention and not limited to one, two or three dimensional scaled designs and hull form alternatives of the invention.

The said buttock lines are indicated starting with label Bt (Bt6, Bt7, Bt8, Bt9, and Bt10) which are the short form identification of Buttock sign in order to display the buttock lines inside the drawings.

The new ship hull has curvative hull form with distinctive section frame lines as shown in FIGS. 1, 2, 3 and 4. The section frame lines of the ship hull are designed transversely symmetrical about the center line CL of the vessel and about the design water line WL8 (TdWL).

The height of the hull Hdwl increases from fore to aft direction, and maximizes at around section St5 and then decreases to the aft transom including aft perpendicular AP and section St0.

FIG. 1 shows the section frame lines St5, St0, StCL, St10, St17, and St19 of the hull which start at points D6, D5, D4, D3, D2, and D1 and run almost a horizontal sinusoidal wave curve and parabola type curvative form in y-direction, and more likely decreasing and increasing at various elevations reference to the y-axis and z-axis, and at some locations follow almost a parallel line form towards the y-direction, and form a round ending at the end of the breadth location which intersect design water line WL8 (Tdwl), and then continue at the below of the design water line WL8 (TdWL) symmetrically with the above described same line form, and end at points F6, F5, F4, F3, F2 and F1.

Figure 2:
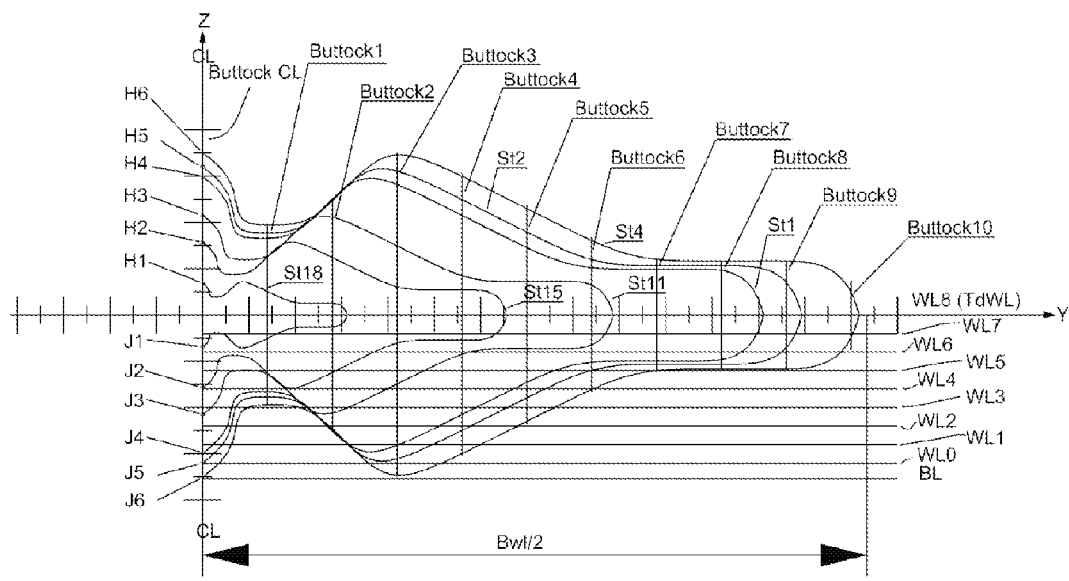
FIG. 2 is a front view of an extract of section frame lines of the ship's hull preferably showing the section frame lines St2, St4, St1, St11, St15, and St18.

FIG. 2 shows the section frame lines St4, St2, St1, St11, St15, and St18 of the hull which start at points H6, H5, H4, H3, H2, and H1 and run almost a horizontal sinusoidal wave curve and parabola type curvative form in y-direction, and more likely decreasing and increasing at various elevations reference to the y-axis and z-axis, and at some locations follow almost a parallel line form towards the y-direction, and form a round ending at the end of the breadth location which intersect design water line WL8 (Tdwl), and then continue at the below of the design water line WL8 (TdWL) symmetrically with the above described same line form, and end at points J6, J5, J4, J3, J2 and J1.

Figure 3:
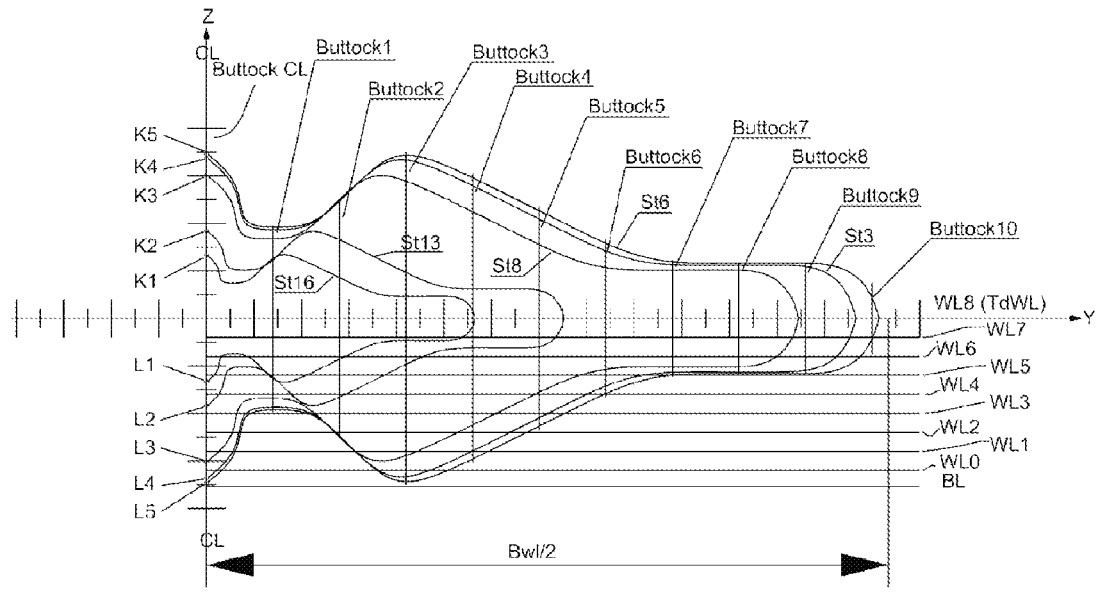
FIG. 3 is a front view of an extract of section frame lines of the ship's hull preferably showing the section frame lines St3, St6, St8, St13, and St16.

FIG. 3 shows the section frame lines St6, St3, St8, St13, and St16 of the hull which start at points K5, K4, K3, K2, and K1 and run almost a horizontal sinusoidal wave curve and parabola type curvative form in y-direction, and more likely decreasing and increasing at various elevations reference to the y-axis and z-axis, and at some locations follow almost a parallel line form towards the y-direction, and form a round ending at the end of the breadth location which intersect design water line WL8 (Tdwl), and then continue at the below of the design water line WL8 (TdWL) symmetrically with the above described same line form, and end at points L5, L4, L3, L2, and L1.

Figure 4:
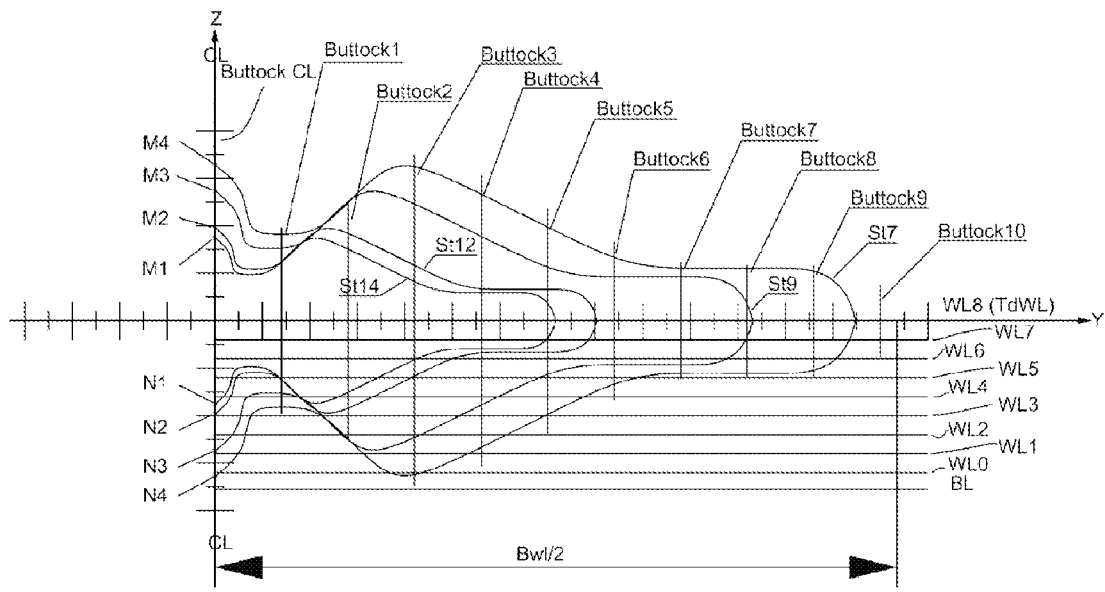
FIG. 4 is a front view of an extract of section frame lines of the ship's hull preferably showing the section frame lines which are labeled as St7, St9, St12, and St14.

FIG. 4 shows the section frame lines St7, St9, St12, and St14 of the hull which start at points M4, M3, M2, and M1 and run almost a horizontal sinusoidal wave curve and parabola type curvative form in y-direction, and more likely decreasing and increasing at various elevations reference to the y-axis and z-axis, and at some locations follow almost a parallel line form towards the y-direction, and form a round ending at the end of the breadth location which intersect design water line WL8 (Tdwl), and then continue at the below of the design water line WL8 (TdWL) symmetrically with the above described same line form, and end at points N4, N3, N2, and N1.

Figure 5:
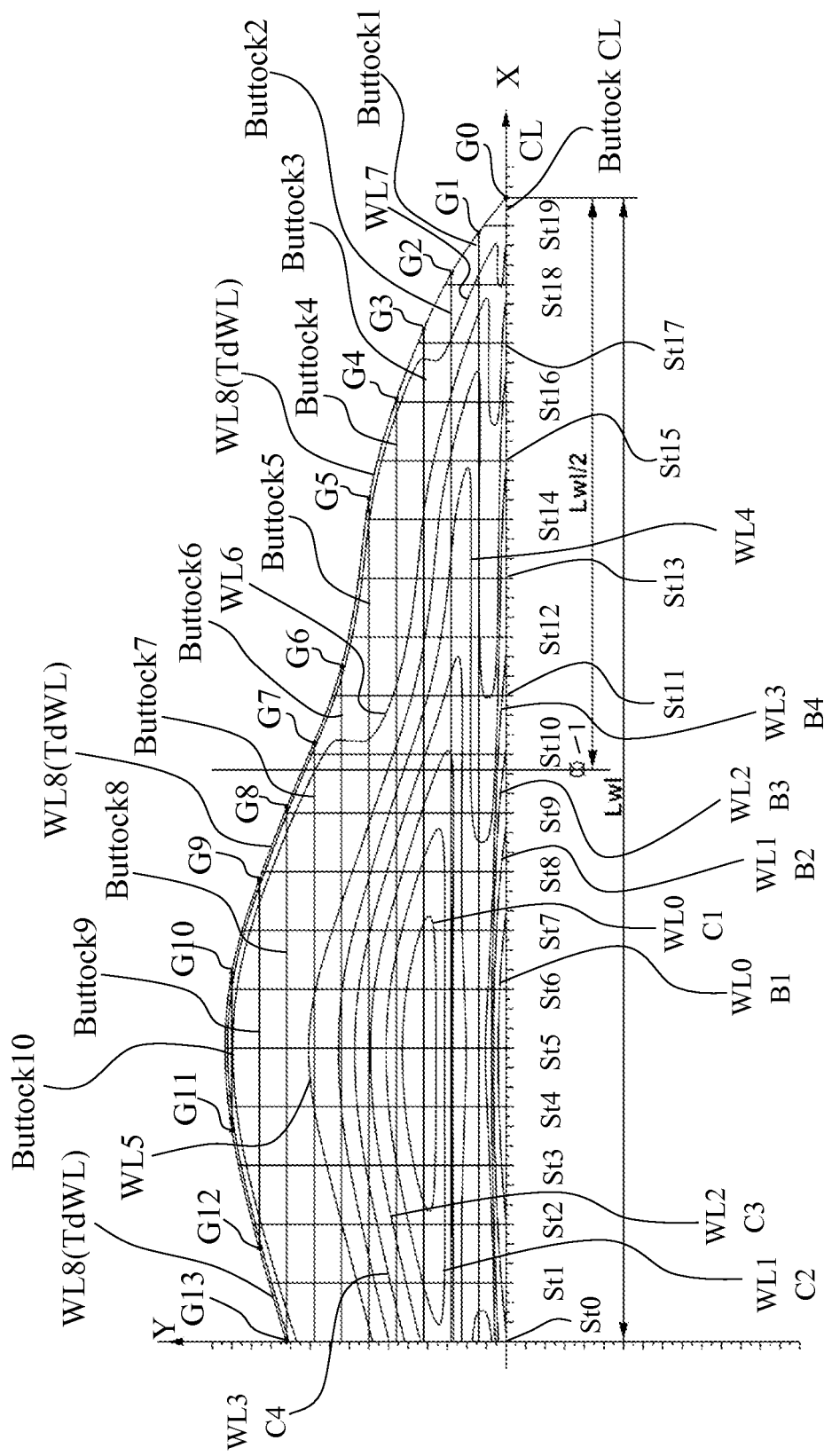
FIG. 5 is a top view of an extract of water lines of the ship's hull.

FIG. 5 shows the water lines WL0, WL1, WL2, WL3, WL4, WL5, WL6, WL7, and WL8 (TdWL) of the hull below design water line including design water line WL8 (TdWL). Each water line has a curvative and distinctive profile form and transversely and symmetrical to the center line CL. The width of the water line WL8 at TdWL increases towards y-direction from fore end to the aft until location around St5, and at around St5 the width decreases in y-direction reference to the center line CL to the aft direction. The said decreasing and increasing width characteristic of the WL8 applies to other water lines WL7, WL6, WL5, WL4, WL3, WL2, WL1, and WL0. The fore head portion of the water line from fore end to the midships, especially on water line WL8 creates better penetration to the fluid when compared with other bulb head forms especially circularly concaved submarine fore head forms. There is a slight decrease in incremental characteristics of the water line WL8 between sections St14 and St13, this characteristic offers reducing hydrodynamic resistance on the opposite direction of the fluid and creates a bulb head like form effect during cruise. On the other hand, this characteristic enable reduced hydrodynamic resistance in case of rearwards movement of the vessel.

Although stern form or transom of the invention is flat, the inventor herein has discovered that flat stern design is providing immediate braking resistance in case of emergency reverse thrusting action and quicker response to reverse stern angle on emergency condition. The inventor herein has discovered that the flat stern design can be re-engineered to a more curvative transom form by adding bi-directional moveable hydrofoils thru the stem line commanded automatically or manually at the time of reverse thrust is needed.

As shown in the embodiment of FIGS. 1, 2, 3, 4, and 5 the inventor has discovered that the reducing breadth Bwl and as shown in the embodiment of FIGS. 1,2,3,4, and 6 height Hdwl of the invention from St5 to stern reduces the drag resistance and eliminates the most of the fluid resistance. The inventor has discovered that the aft hull form from St5 to St0 enables the reduced resistance in case of rearwards motion of the vessel.

Figure 15:
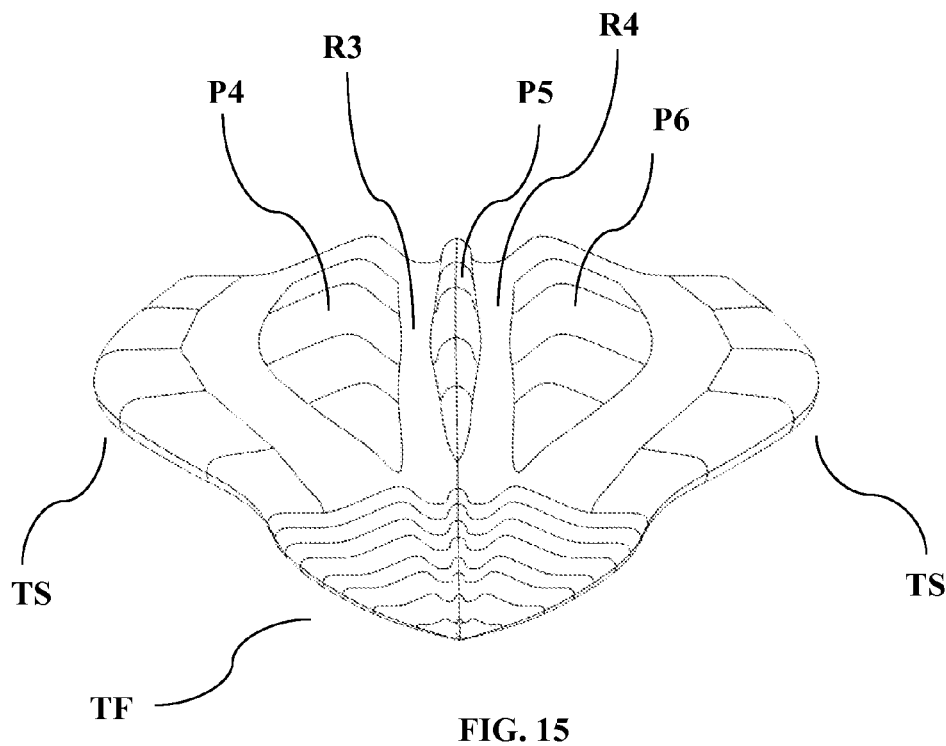
FIG. 15 is another perspective view of the basic shape of hull in FIG. 8, principally from above front showing tank sections TS and TF, hull portions P4, P5 and P6, flow channels R3 and R4.
Figure 16:
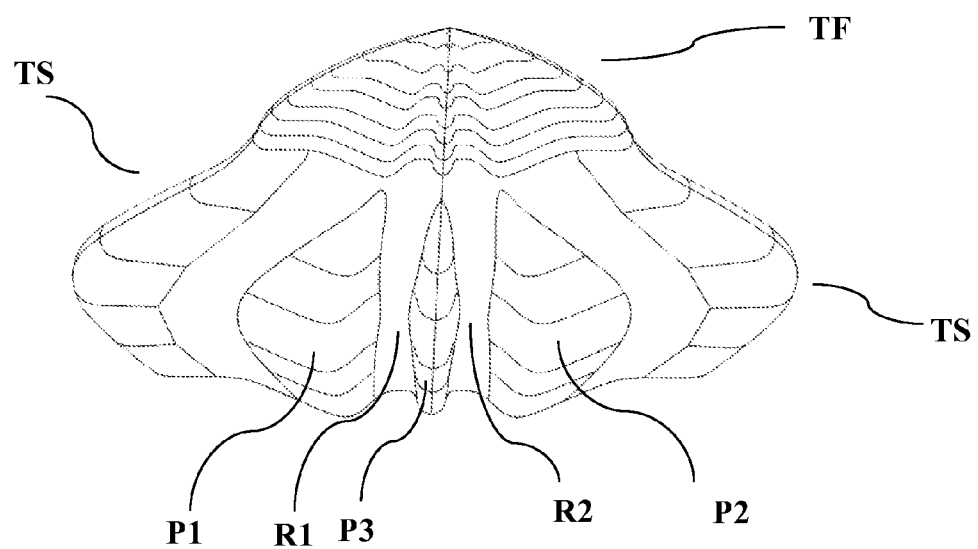
FIG. 16 is another perspective view of the basic shape of hull in FIG. 8, principally from front below showing tank sections TS and TF, hull portions P1, P2 and P3, flow channels R1 and R2
Figure 17:
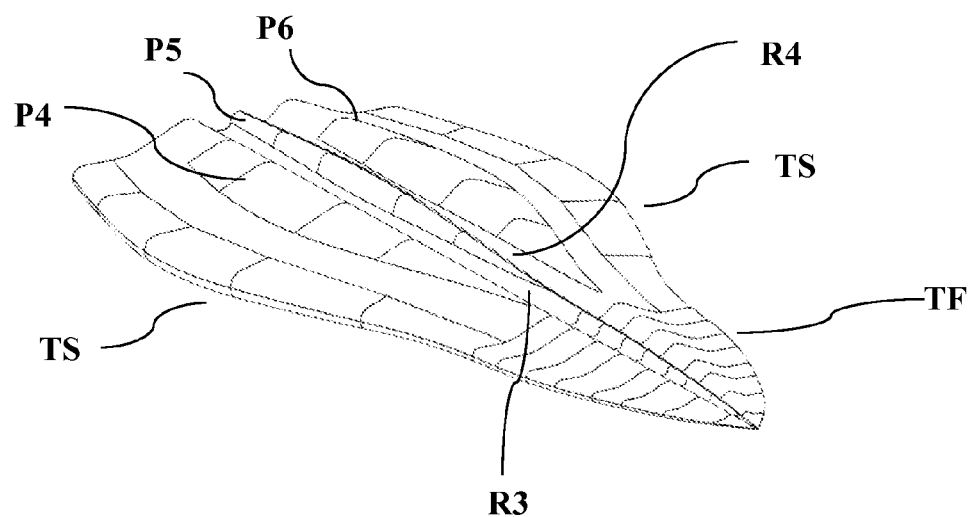
FIG. 17 is another perspective view of the basic shape of hull in FIG. 8, principally from front right above showing tank sections TS and TF, hull portions P4, P5 and P6, flow channels R3 and R4.
Figure 18:
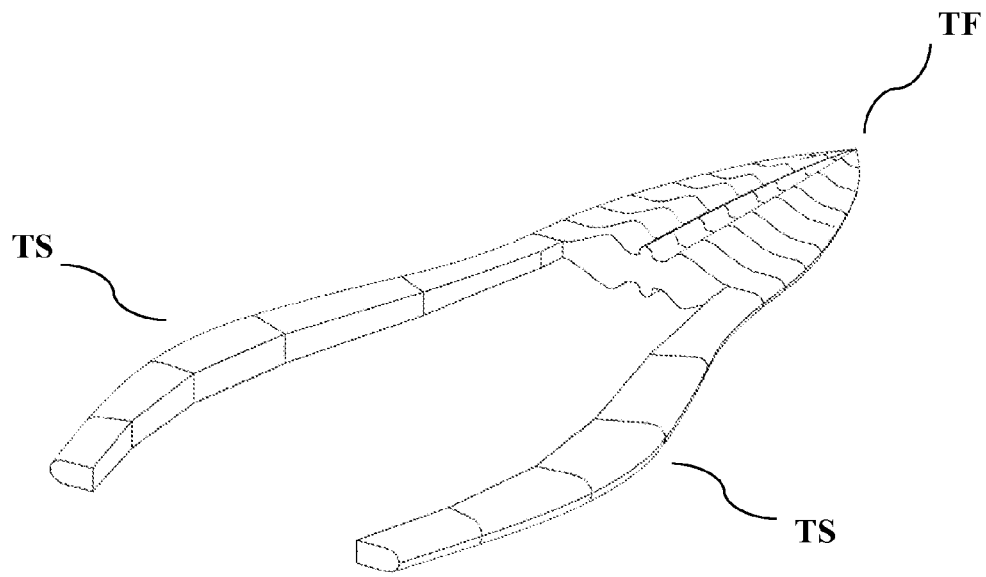
FIG. 18 is another perspective view of the basic shape of hull in FIG. 8, principally from backwards upper right showing fore TF and side tanks TS.
Figure 19:
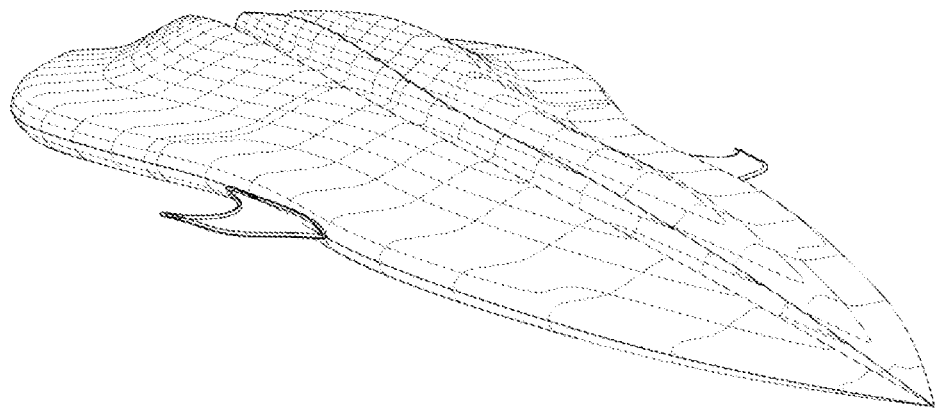
FIG. 19 is another perspective view of the basic shape of hull in FIG. 8, principally from front upper right showing elevation rudders 9 at fully extracted position from the hull.
Figure 20:
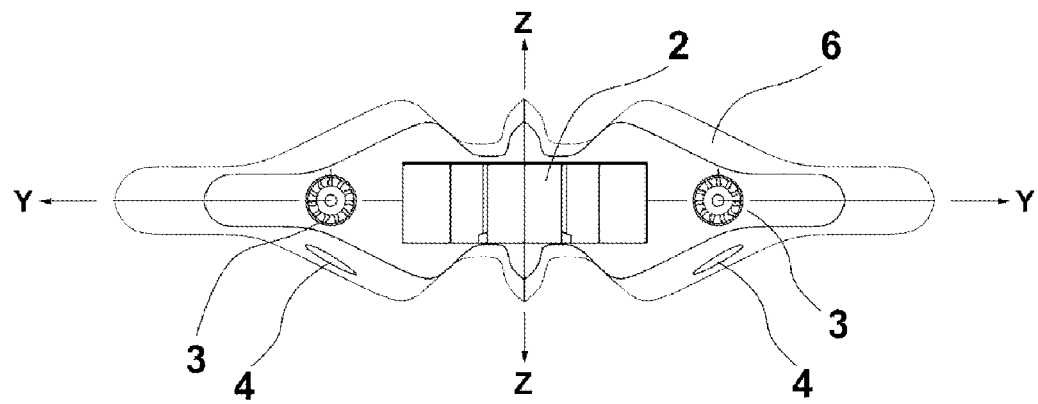
FIG. 20 is another perspective view of the basic shape of hull in FIG. 8, principally from backwards showing cargo door 2, jet-pumps 3 and jet-pump inlet holes 4.
Figure 21:
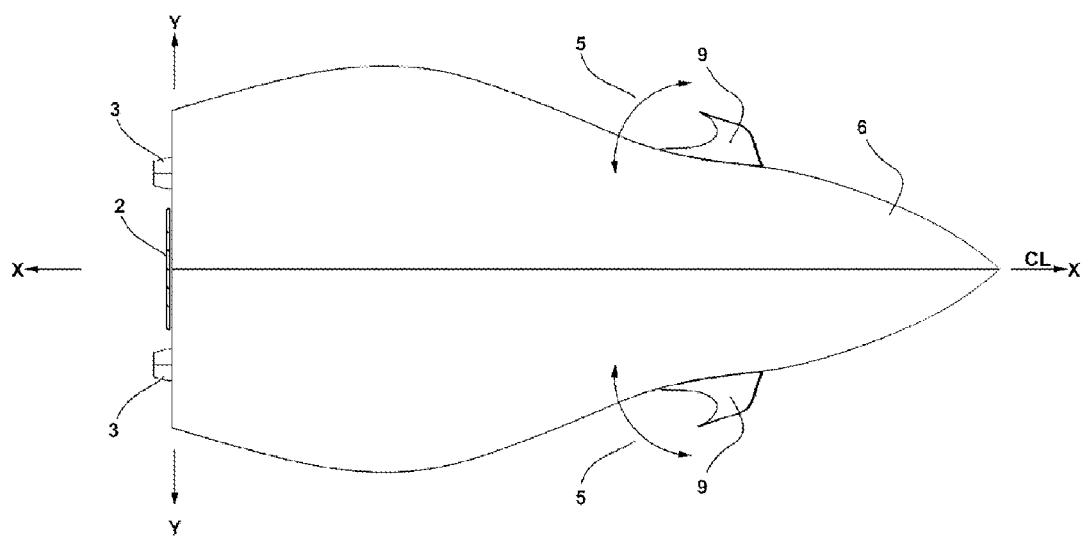
FIG. 21 is another perspective view of the basic shape of hull in FIG. 8, principally from top showing cargo door 2, jet-pumps 3, elevation rudders 9.
Figure 22:
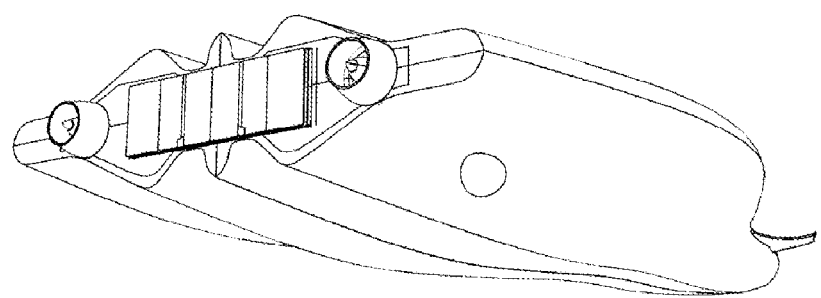
FIG. 22 is another perspective view of the basic shape of hull in FIG. 8, principally from backwards lower right showing cargo door 2, jet-pumps 3, elevation rudders 9, and jet-pump inlet holes 4.

According to FIGS. 15, 16, and 17 the invention has six combined longitudinal curvative hull portions P1, P2, P3, P4, P5, and P6. According to FIG. 5; the hull portions P1, P2, P4, and P6 are characterized by profile lines C1, C2, C3 and C4 at water lines respectively WL0, WL1, WL2 and WL3 as side portions one at the port and one at the starboard side are transversely symmetrical to the center line CL from fore to aft. According to FIG. 5; the hull portions P3, and P5 are located on center line CL and have a curvative and elliptical form from aft to fore along with the x, y, and z axis which is characterized by the profile lines B1, B2, B3, and B4 at water lines respectively WL0, WL1, WL2, and WL3. The centerline hull portions are symmetrical from the centerline horizontally and transversely.

According to FIGS. 15, 16, and 17 the hull portions P1, P2, P3, P4, P5 and P6 are offering upper, middle and lower tank and/or additional cargo holding locations.

Height of all hull portions P1, P2, P3, P4, P5 and P6 increases from sections St0 to St5 and then decreases at around section St5 and continue to decrease far to beyond of St19 until to the fore end, except between sections St13 and St14, the height of the said hull portions slightly increases and at around section St14 the height decreases to the fore end. This form characteristic gives an arrow head form to the profile of the vessel and enables the necessary form option at super cavitation speeds.

According to FIGS. 1, 2, 3, 4, 5 and 6, there are four flow channels R1, R2, R3 and R4 (more clearly illustrated in FIGS. 9, 10, 11, 12, 13, 14, 15, 16, 17, 19, 20 and 22) between semi-hull portions P1 and P3 and between P2 and P3 and symmetrical above the design water line TdWL (between P4 and P5, and between P5 and P6) along the hull on longitudinal (from aft to fore on positive x-direction) direction. The flow channels R1, R2, R3 and R4 on all sides and above and below design water line TdWL enlarge from fore end to aft end with a curvative form on the opposite direction of the cruise stem line. The flow channels R1, R2, R3 and R4 have half-open nozzle formation along with the opposite direction of the stem line in order to enable the faster release of the water from after the horizontal midline of vessel's length Lwl. The flow channels R1, R2, R3 and R4 have conical form lines perpendicular to x axis according to FIGS. 1, 2, 3, and 4. The average absolute height value of the surface start point of flow channels R1, R2, R3 and R4 reduces after St5 towards St0 along with the opposite direction of the stem line in order to reduce hydrodynamic pressure on the opposite direction of the fluid and easy movement of the fluid to the aft portion of the vessel.

Figure 6:
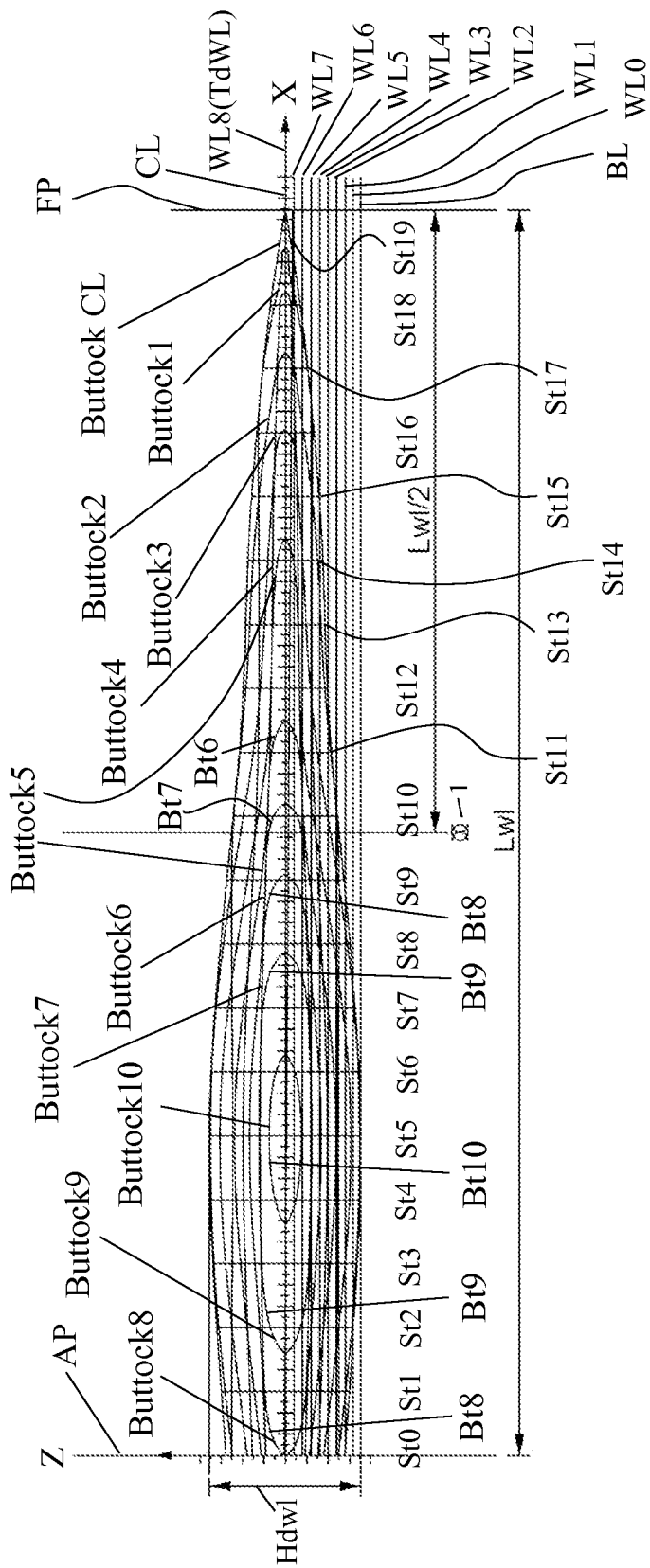
FIG. 6 is a side view of an extract of buttock lines of the ship's hull.
Figure 7:
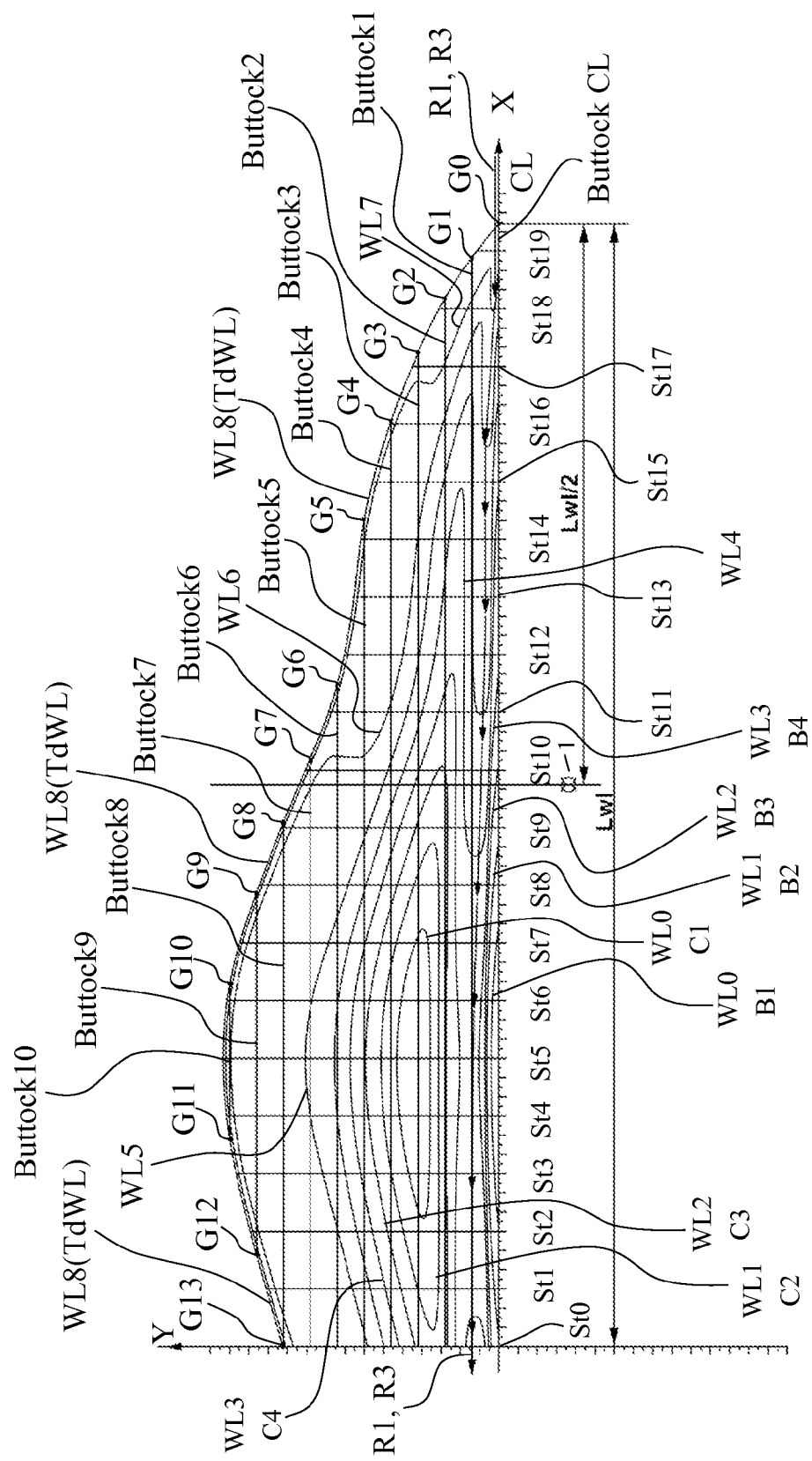
FIG. 7 is a top view of an extract of water lines of the ship's hull which is showing the flow channels R1 and R3.
Figure 8:
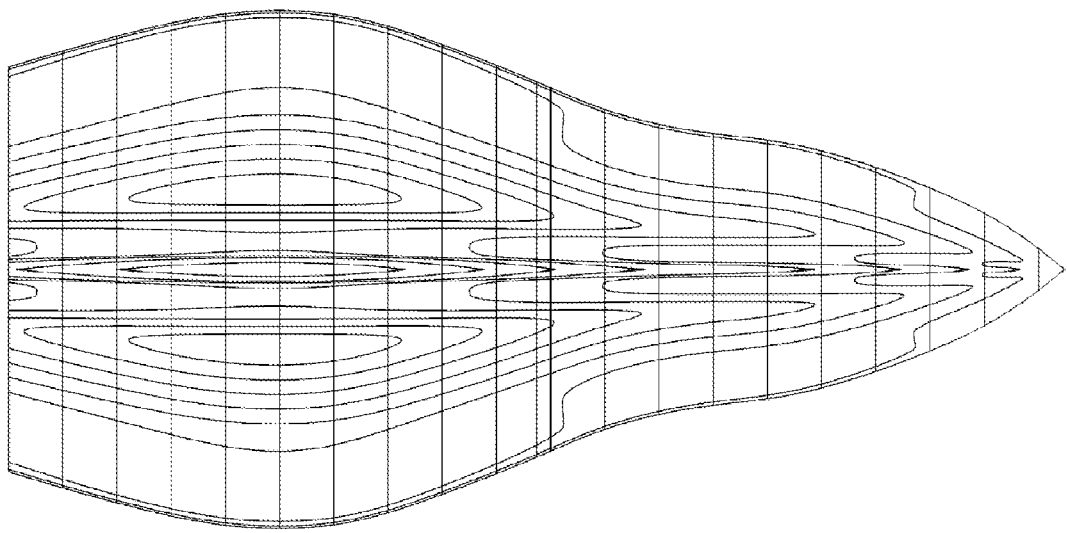
FIG. 8 is a perspective view of the ship's hull, principally from below with the hull designed according to the invention.
Figure 9:
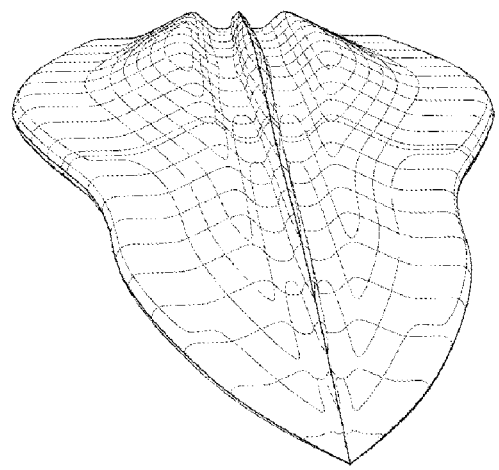
FIG. 9 is another perspective view of the basic shape of hull in FIG. 8, principally from above front.
Figure 10:
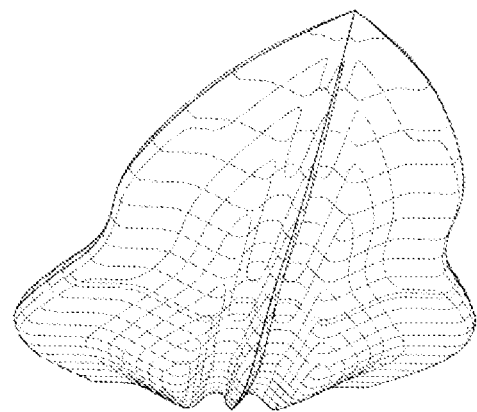
FIG. 10 is another perspective view of the basic shape of hull in FIG. 8, principally from front below.
Figure 11:
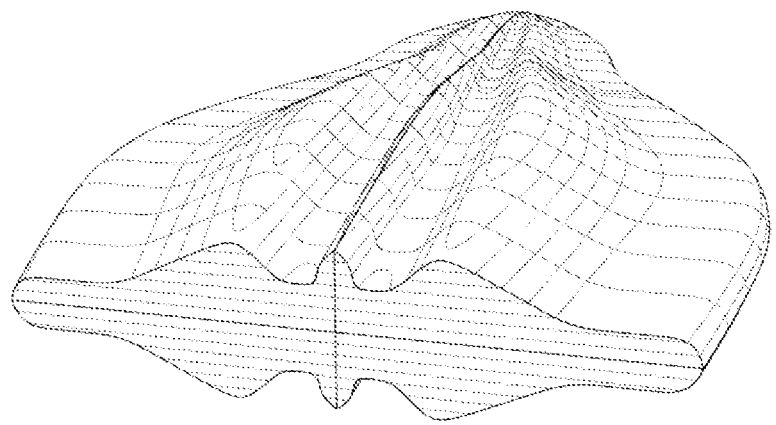
FIG. 11 is another perspective view of the basic shape of hull in FIG. 8, principally from backwards upper right.
Figure 12:
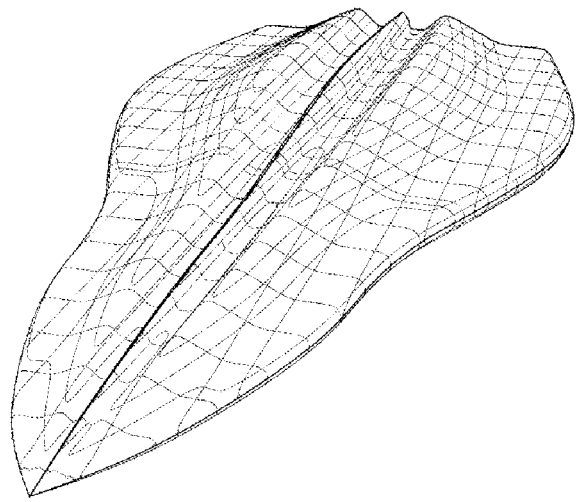
FIG. 12 is another perspective view of the basic shape of hull in FIG. 8, principally from front upper left.
Figure 13:
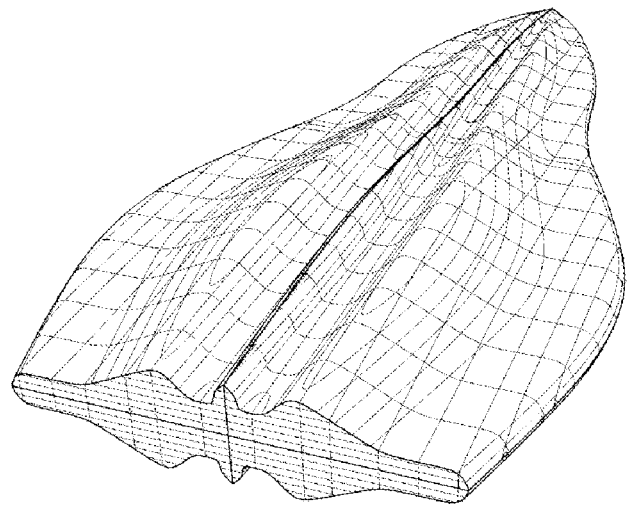
FIG. 13 is another perspective view of the basic shape of hull in FIG. 8, principally from backwards upper right.
Figure 14:
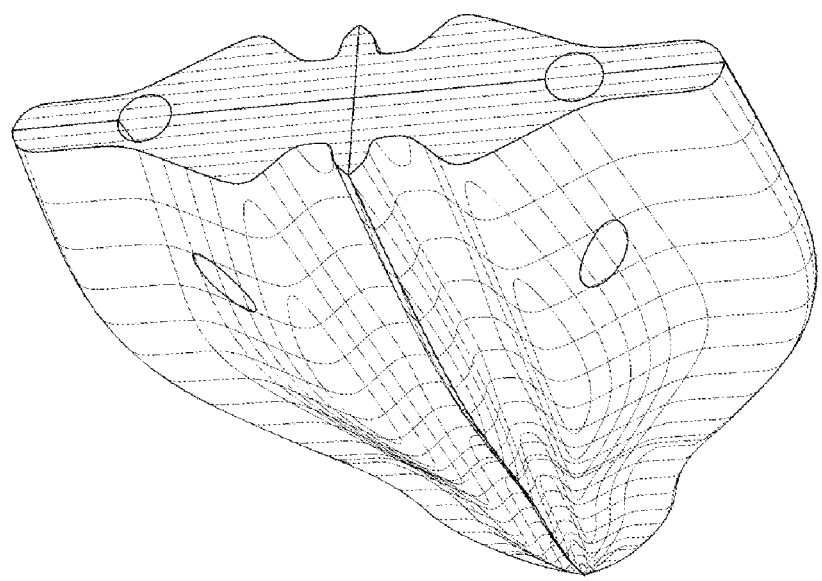
FIG. 14 is further perspective view of the basic shape of hull in FIG. 8, principally from backwards below right showing jet-pump inlet and outlet holes.

According to FIGS. 4, 5 and 6, at the design water level WL8(TdWL), the inventor has discovered that the hull provide a chine form which creates a planning at increasing speeds when the invention is cruising on water surface. The increasing height of the hull profile relative to x axis towards the opposite direction of the stem line from fore end to around section St5 together with the flow channels R1 and R2 ensuring an increasing lifting hydrodynamic force is created by an effect of fluid resistance force normal with the vessel's surface towards the stem line.

According to FIGS. 15, 16, 17, and 18, the ship has side tanks TS, fore tanks TF, upper and lower tanks designed as hull portions P1, P2, P4, and P6, and middle tanks designed as hull portions P3, and P5. Any or all of these tanks may be designed detachable according the said service purpose of the invention in claims or may not be included to the construction based on the design of the invention.

According to FIGS. 19, 21, 22, and 23, the invention has elevation rudders 9 that slides from inside the hull to outside the hull with desired portion via horizontal direction 5 and/or moves vertically on either positive or negative z-direction. These rudders 9 may give an option to adjust the elevation of the invention during underwater cruise with the help of changing the hydrodynamic resistance force vector direction on the surface of the rudder area. The elevation rudders 9 may be used for reducing speed as a kind of brake system. The elevation rudders 9 may be used to assist in maneuvering by using in different movement portions outside hull in direction 5 and/or moving vertically for giving different angle of attacks to port and starboard rudders.

According the FIGS. 14, 20, 21, 22, and 23, for the illustrated exemplary embodiment, the invention may be equipped with a jet-pump or water-jet system or a propeller with a nozzle construction by adding inlet holes 4 and outlets 3.

Figure 23:
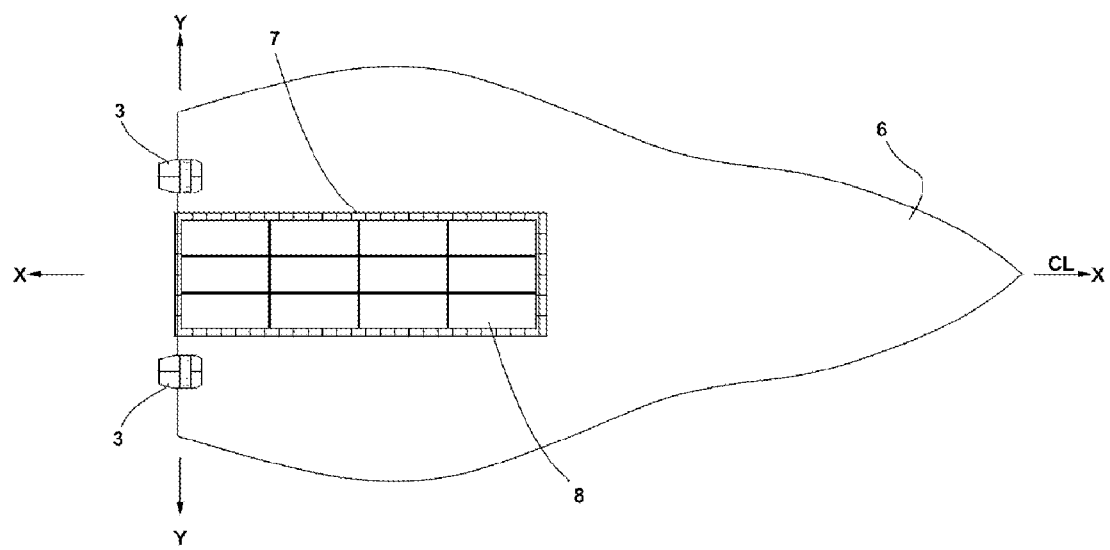
FIG. 23 is a layout view of the basic shape of hull in FIG. 8, principally showing the locations of cargo bay 7, cargo container 8 layout inside the cargo bay, and jet-pumps 3.
Figure 24:
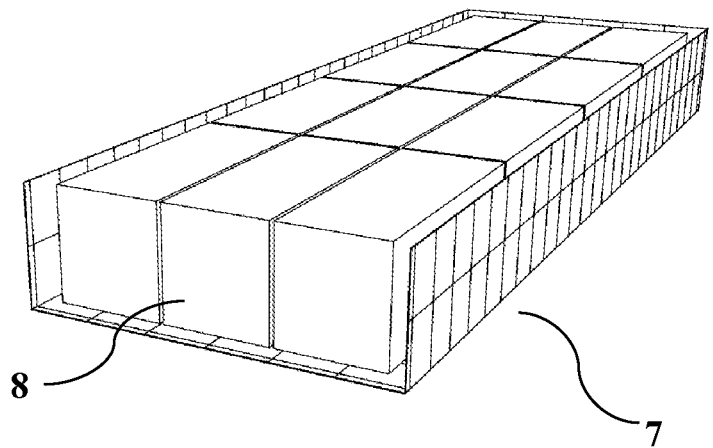
FIG. 24 is a perspective view of the cargo bay 2 in FIG. 23, principally from backwards upper right showing cargo container 8 loading layout without cargo door.
Figure 25:
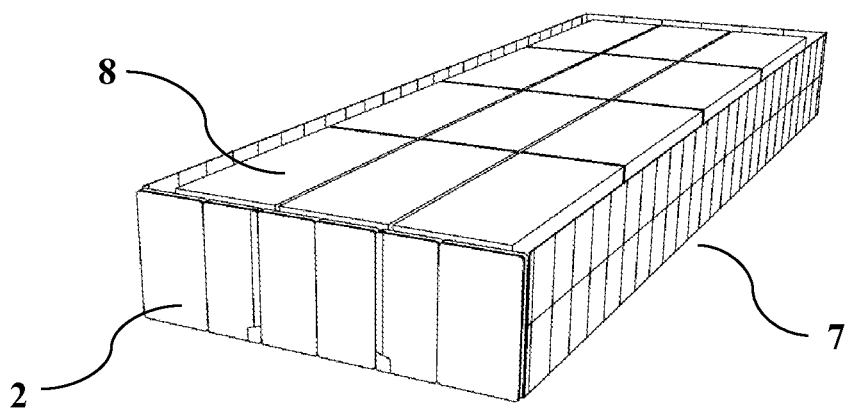
FIG. 25 is another perspective view of the cargo bay 7 in FIG. 23, principally from backwards upper right showing cargo container 8 loading layout, and cargo door 2 closed.

According to FIGS. 23, 24, and 25, the invention is equipped with a cargo bay 7 in order to carry containers 8 or any type of cargo described in the claims.

According to FIGS. 20, 21, 22, 23 and 25, the invention is equipped with a cargo door 2 in multiple door sections that may be operated all together or individually for opening and closing by using various actuator systems like hydraulics, pneumatics, electric motors, or steam pistons. The cargo door 2 may further comprising be connected to a cargo tunnel of an underwater hub.

For the illustrated and described exemplary embodiment, it may be specified that Tdwl=3.54 meters, Lwl=58.43 meters, Bwl=28.68 meters and Hdwl=7.08 meters.

Instead of a rudder and propeller, any other steering and propulsion means as known in the art may be provided, including for example combined steering and propulsion means such as azimuth propellers.

While various preferred embodiments of the invention have been described and illustrated herein, it will be appreciated that various modifications can be made to the new ship hull design without departing from either spirit or scope of the present invention. The illustrated and described embodiments are thus to be considered as exemplary and the invention itself should be evaluated only as defined in the claims which follow.

While only one embodiment of the invention has been disclosed, other embodiments may become apparent to those skilled in the art, therefore one should study the drawings, description and claims for a full understanding of the invention.

The invention claimed is:

1. A hull configuration capable of use as a submarine, a surface vessel or a boat with a planning type hull comprising;
    a hull form having a longitudinal centerline (CL), a design waterline (TdWL), a hull height (Hdwl), a breadth (Bwl) measured at the design waterline (TdWL), a baseline of the hull (BL), a bow end and a stern end;
    said hull form has section frame lines (St0, St1, St2, St3, St4, St5, St6, St7, St8, St9, St10, St11, St12, St13, St14, St15, St16, St17, St18 and St19) evenly spaced from the stern end to the bow end respectively, and section frame line (StCL) located at midships (1) of the hull located between an aft perpendicular (AP) and a forward perpendicular (FP);
    said section frame lines are transversely symmetrical to the center line (CL);
    said section frame lines are vertically symmetrical about a plane containing the design waterline (TdWL);
    wherein said hull height increases from said section frame line (St19) to a maximum hull height approximate to section frame line (St5) and then decreases in height to the aft perpendicular;
    wherein said hull breadth (Bwl) increases from said section frame line (St19) to a maximum hull breadth approximate to section frame line (St5) and then decreases in breadth to the aft perpendicular;
    said hull form further includes side hull portions (P1, P2) located starboard and port of the centerline (CL) respectively below the design waterline (TdWL), and side hull portions (P4, P6) located starboard and port of the centerline (CL) respectively above the design waterline (TdWL); wherein side hull portions (P1, P4) are transversely symmetrical about the longitudinal centerline (CL) to side hull portions (P2, P6), and side hull portions (P1, P2) are vertically symmetrical to side hull portions (P4, P6);
    said hull form further includes center hull portions (P3, P5), center hull portion (P3) located below the design waterline (TdWL) and having transverse symmetry about the longitudinal centerline (CL) and being vertically symmetrical about a plane containing the design waterline (TdWL) to center hull portion (P5);
    said hull form further includes flow channels (R1, R2, R3, R4) formed by the side hull portions and the center hull portions, wherein flow channel (R1) is located between side hull portion (P1) and center hull portion (P3), wherein flow channel (R2) is located between side hull portion (P2) and center hull portion (P3), wherein flow channel (R3) is located between side hull portion (P4) and center hull portion (P5), wherein flow channel (R4) is located between side hull portion (P6) and center hull portion (P5);
    wherein the section frame lines (St5), (St0), (StCL), (St10), (St17), and (St19) start from depth points (F6), (F5), (F4), (F3), (F2), and (F1), wherein depth point (F6) is lower than the other section frame line starting points relative to the base line (BL), wherein the section frame lines (St5), (St0), (StCL), (St10), (St17), and (St19) end at upper points (D6), (D5), (D4), (D3), (D2) and (D1) respectively, said upper point (D6) is higher than the other section frame line upper ending points relative to the base line (BL);
    wherein the section frame lines (St4), (St2), (St1), (St 11), (St15), and (St18) start from depth points (J6), (J5), (J4), (J3), (J2), and (J1), wherein depth point (J6) is lower than the other depth points (J1), (J2), (J3), (J4), and (J5) relative to the base line (BL), wherein the section frame lines (St4), (St2), (St1), (St 11), (St15), and (St18) end at upper points (H6), (H5), (H4), (H3), (H2) and (H1), wherein upper point (H6) is higher than the other section frame line starting points (H5), (H4), (H3), and (H2) relative to the base line (BL);
    wherein the section frame lines (St6), (St3), (St8), (St 13), and (St 16) start from depth points (L5), (L4), (L3), (L2), and (LI), wherein depth point (L5) is lower than the other depth points (L4), (L3), (L2), and (L1) relative to the base line (BL), wherein the section frame lines (St6), (St3), (St8), (St 13), and (St 16) end at upper points (K5), (K4), (K3), (K2) and (K1), wherein upper point (K5) is higher than the other section frame line ending points (K4), (K3), (K2), and (K1) relative to the base line (BL);
    wherein the section frame lines (St7), (St9), (St 12), and (St 14) start from depth points (N4), (N3), (N2), and (NI), wherein depth point (N4) is lower than other section frame line depth points (N3), (N2), and (NI), wherein the section frame lines (St7), (St9), (St12), and (St14) end at upper points (M4), (M3), (M2) and (M1), wherein upper point (M4) is higher than the other section frame line end points (M3), (M2), and (M1).

2. The hull configuration of claim 1, wherein the port hull portion (P2) starts at water line (WL4) and is characterized by water line profile curves (C1), (C2), (C3), and (C4) on water lines (WLO), (WL1), (WL2), and (WL3), wherein the center hull portion (P3) starts from water line (WL4) and is characterized by water line profile curves (BI), (B2), (B3), and (B4), wherein the center hull portions (P3) and (P5) are located along the center line (CL) having waterline profile curves (BI), (B2), (B3), (B4).

* * * * *